US011208105B2

(12) United States Patent
Tada et al.

(10) Patent No.: US 11,208,105 B2
(45) Date of Patent: Dec. 28, 2021

(54) VEHICLE CONTROL DEVICE

(71) Applicant: DENSO CORPORATION, Kariya (JP)

(72) Inventors: Kazuhiko Tada, Kariya (JP); Akira Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 296 days.

(21) Appl. No.: 16/247,913

(22) Filed: Jan. 15, 2019

(65) Prior Publication Data

US 2019/0143977 A1 May 16, 2019

Related U.S. Application Data

(63) Continuation of application No. PCT/JP2017/025325, filed on Jul. 11, 2017.

(30) Foreign Application Priority Data

Jul. 12, 2016 (JP) .............................. JP2016-137890

(51) Int. Cl.
*B60L 9/00* (2019.01)
*G05D 1/00* (2006.01)
(Continued)

(52) U.S. Cl.
CPC ......... *B60W 30/18072* (2013.01); *B60K 6/26* (2013.01); *B60K 6/387* (2013.01);
(Continued)

(58) Field of Classification Search
CPC ........... B60W 30/18072; B60W 10/00; B60W 10/18; B60W 20/40; B60W 10/30;
(Continued)

(56) References Cited

U.S. PATENT DOCUMENTS 6,098,733 A * 8/2000 Ibaraki .................. B60L 3/0084
180/65.28
6,118,237 A 9/2000 Kikuchi et al.
(Continued)

FOREIGN PATENT DOCUMENTS

JP    2011-219087 A    11/2011
JP    2014-184817 A    10/2014
(Continued)

OTHER PUBLICATIONS

English Translation for JP2014184817A.*
Sep. 26, 2017 International Search Report issued in International Patent Application No. PCT/JP2017/025325.

*Primary Examiner* — Mahmoud S Ismail
(74) *Attorney, Agent, or Firm* — Oliff PLC

(57) ABSTRACT

An engine ECU includes a traveling control unit configured to bring a clutch device into a disconnection state to perform inertial traveling of a vehicle according to satisfaction of predetermined inertial traveling implementation conditions and configured to bring the clutch device into a connection state to cancel an inertial traveling state and perform regenerative power generation according to satisfaction of predetermined regenerative power generation implementation conditions during the inertial traveling, and a required power calculation unit configured to calculate required power of the vehicle; and the traveling control unit selectively performs the inertial traveling or the regenerative power generation an ISG based on the required power calculated in a state in which the inertial traveling implementation conditions are satisfied.

16 Claims, 7 Drawing Sheets

(51) Int. Cl.
*G05D 3/00* (2006.01)
*G06F 7/00* (2006.01)
*G06F 17/00* (2019.01)
*B60W 30/18* (2012.01)
*B60K 6/485* (2007.10)
*B60W 10/02* (2006.01)
*B60W 10/08* (2006.01)
*B60W 20/14* (2016.01)
*B60W 10/00* (2006.01)
*B60W 10/18* (2012.01)
*B60K 6/54* (2007.10)
*B60W 20/40* (2016.01)
*B60W 10/30* (2006.01)
*B60K 6/26* (2007.10)
*B60K 6/387* (2007.10)
*B60W 50/00* (2006.01)

(52) U.S. Cl.
CPC ............... *B60K 6/485* (2013.01); *B60K 6/54* (2013.01); *B60W 10/00* (2013.01); *B60W 10/02* (2013.01); *B60W 10/08* (2013.01); *B60W 10/18* (2013.01); *B60W 10/30* (2013.01); *B60W 20/14* (2016.01); *B60W 20/40* (2013.01); *B60K 2006/268* (2013.01); *B60W 50/00* (2013.01); *B60W 2050/0075* (2013.01); *B60W 2556/10* (2020.02); *B60W 2710/021* (2013.01); *B60W 2710/08* (2013.01); *Y02T 10/62* (2013.01)

(58) Field of Classification Search
CPC ...... B60W 10/02; B60W 10/08; B60W 20/14; B60W 50/00; B60W 2050/0089; B60W 2710/021; B60W 2710/08; B60K 6/54; B60K 6/26; B60K 6/387; B60K 6/485; B60K 2006/268; Y02T 10/62; Y02T 10/60
USPC ...................................................... 701/22, 36
See application file for complete search history.

(56) References Cited

U.S. PATENT DOCUMENTS

| | | | |
|---|---|---|---|
| 2012/0330505 A1* | 12/2012 | Tsumori | B60W 20/00 701/36 |
| 2013/0073507 A1* | 3/2013 | Sera | G06N 5/02 706/46 |
| 2013/0226380 A1* | 8/2013 | Ando | B60W 20/15 701/22 |
| 2013/0325230 A1 | 12/2013 | Kim | |
| 2016/0297424 A1* | 10/2016 | Park | F01N 3/2006 |

FOREIGN PATENT DOCUMENTS

| | | | |
|---|---|---|---|
| JP | 2014184817 A | * | 10/2014 |
| JP | 2015-058783 A | | 3/2015 |

* cited by examiner

VEHICLE CONTROL DEVICE

CROSS-REFERENCE TO RELATED APPLICATION

The present application is based on Japanese Patent Application No. 2016-137890 filed on Jul. 12, 2016, the entire contents of which are incorporated herein by reference.

BACKGROUND

1. Technical Field

The present disclosure relates to a vehicle control device.

2. Background Art

Coasting is a technique, in which non-execution of driver's brake operation or accelerator operation is, while a vehicle is traveling, detected and a clutch provided between an engine and a transmission is brought into a disconnection state to perform inertial traveling of the vehicle.

SUMMARY

In the present disclosure, provided is a vehicle control device as following. The vehicle control device brings a clutch device into a disconnection state to perform inertial traveling of the vehicle if a predetermined inertial traveling implementation condition is satisfied. The vehicle control device brings the clutch device into a connection state to cancel an inertial traveling state. The vehicle control device performs regenerative power generation if a predetermined regenerative power generation implementation condition during the inertial traveling is satisfied, and calculates required power of the vehicle. The vehicle control device selectively performs the inertial traveling or the regenerative power generation by a rotating electrical machine based on the required power calculated in a state in which the inertial traveling implementation condition is satisfied.

DETAILED DESCRIPTION OF THE PREFERRED EMBODIMENTS

Figure 1:
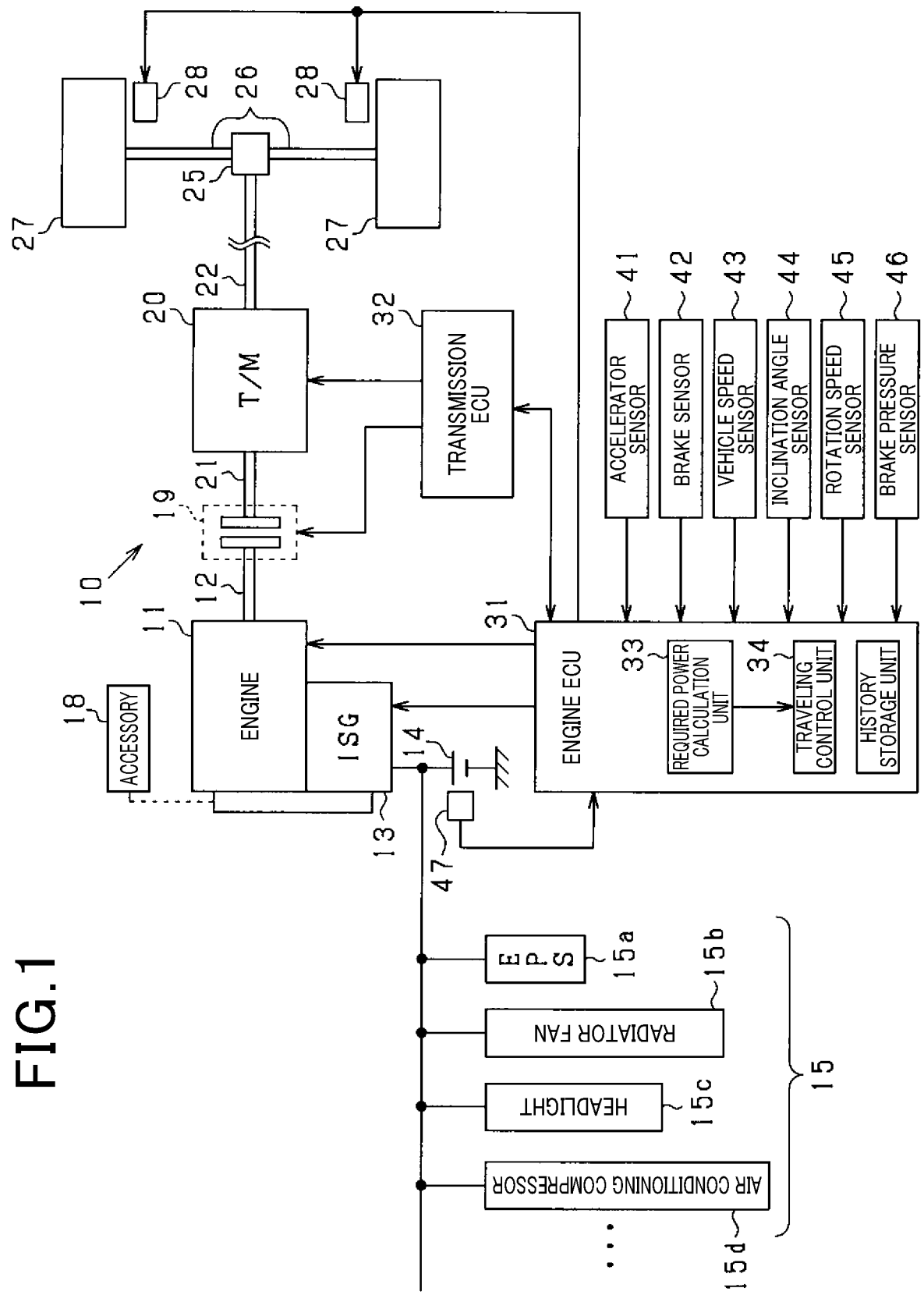
FIG. 1 is a schematic configuration diagram of a vehicle control system.

The inventor of the present disclosure has studied the following technique as a vehicle control technique capable of properly selecting inertial traveling or regenerative power generation to improve fuel consumption.

The coasting is a technique utilized for directly using kinetic energy of the vehicle for traveling, and a vehicle travel distance is increased so that fuel consumption can be improved. Meanwhile, regeneration for converting the kinetic energy into electrical energy has been also used in practice as the technique of improving fuel consumption. Such regeneration causes a motor to function as a power generator by rotation of an engine output shaft or an axle. A battery is charged with the electrical energy generated by the regeneration.

In a case where the vehicle is coasting, the kinetic energy of the vehicle is preferably directly utilized for traveling, and therefore, implementation of the regenerative power generation is stopped during the inertial traveling. For this reason, the opportunities for regenerative power generation are reduced due to implementation of the inertial traveling. In such a case, a system fuel consumption reduction effect might be reduced according to a vehicle power status. That is, it is assumed that implementation of idling stop is limited and the opportunities of power generation due to fuel consumption are increased.

The present disclosure provides a vehicle control technique capable of properly selecting inertial traveling or regenerative power generation to improve fuel consumption.

A first aspect relates to a vehicle control device applied to a vehicle including an engine as a travel drive source, a clutch device provided on a power transmission path connected to the engine, a rotating electrical machine connected to a power supply unit and configured to perform regenerative power generation by power of the power transmission path to supply generated power to a power supply unit side, and an electrical load connected to the power supply unit, the vehicle control device including a traveling control unit configured to bring the clutch device into a disconnection state to perform inertial traveling of the vehicle if a predetermined inertial traveling implementation condition is satisfied and configured to bring the clutch device into a connection state to cancel an inertial traveling state and perform the regenerative power generation if a predetermined regenerative power generation implementation condition during the inertial traveling is satisfied and a required power calculation unit configured to calculate required power of the vehicle, and the traveling control unit selectively performing the inertial traveling or the regenerative power generation by the rotating electrical machine based on the required power calculated in a state in which the inertial traveling implementation condition is satisfied.

In a state in which the vehicle is coasting, implementation of the regenerative power generation is stopped, and therefore, the opportunities for regenerative power generation are reduced due to implementation of the inertial traveling. In such a case, an adverse effect might be produced on fuel consumption according to the vehicle power status. Thus, the vehicle power status is preferably taken into consideration during the inertial traveling is being performed.

In this regard, in the above-described configuration, the inertial traveling or the regenerative power generation by the rotating electrical machine is selectively performed based on the required vehicle power. In this case, the opportunity for regenerative power generation can be properly provided according to a vehicle power request. As a result, a vehicle power state can be stably held while travel favorable for fuel consumption can be performed. Thus, the inertial traveling or the regenerative power generation can be properly selected and performed, and fuel consumption can be improved.

Note that the required vehicle power includes, for example, required power in association with driving (i.e., power consumption) of the electrical load, and required power in association with a decrease in the amount of power stored in the power supply unit.

According to a second aspect, the traveling control unit performs the regenerative power generation in a case where it is determined that the required power is higher than a predetermined power threshold, and performs the inertial traveling in a case where it is determined that the required power is equal to or lower than the power threshold.

In the above-described configuration, the regenerative power generation by the rotating electrical machine is performed in a case where the required power is higher than the power threshold. Thus, in the case of high required power, power consumption of a battery can be reduced. As a result, the vehicle power state can be stably held. Moreover, in the above-described configuration, the inertial traveling is performed in a case where the required power is equal to or lower than the power threshold. Thus, a travel distance of the vehicle can be increased in the case of low required power of the vehicle. With the above-described configuration, the inertial traveling or the regenerative power generation can be properly selected and performed, and fuel consumption can be improved.

According to a third aspect, the power threshold has a first power threshold and a second power threshold greater than the first power threshold, the inertial traveling is permitted in a case where it is determined that the required power is lower than the first power threshold in a state in which the regenerative power generation is performed, and the regenerative power generation is permitted in a case where it is determined that the required power is higher than the second power threshold in the inertial traveling state.

In the above-described configuration, two thresholds are set as the power threshold, and hysteresis is provided between these thresholds. Thus, disadvantages such as frequent switching between the state of performing the regenerative power generation and the state of performing the inertial traveling due to fluctuation in the required power and lowering of drivability due to such switching can be reduced.

According to a fourth aspect, the vehicle control device further includes a short-term load determination unit configured to determine whether a short-term load to be temporarily driven and used is included in the driven electrical loads in a vehicle deceleration state during the inertial traveling; and in a case where it is determined that the short-term load is included, the inertial traveling is more likely to be selected as compared to a case where the short-term load is not included.

It is assumed that the electrical loads of the vehicle include the short-term load to be temporarily driven and used, and a long-term load to be driven and used for a long period of time. For example, it is predicated that the electrical load such as a headlight or an air conditioning compressor is driven for a long period of time in a drive cycle thereof. On the other hand, it is predicated that the electrical load such as an electric power steering or a radiator fan is temporarily driven.

In this regard, in the above-described configuration, when the driven electrical loads include the short-term load during the inertial traveling, the inertial traveling is more likely to be selected. Thus, frequent switching between the inertial traveling and the regenerative power generation due to use of the short-term load during the inertial traveling can be reduced.

According to a fifth aspect, the required power calculation unit calculates the required power as a smaller value in a case where it is determined that the short-term load is included than in a case where the short-term load is not included.

In the above-described configuration, when the driven electrical loads include the short-term load during the inertial traveling, the required power is set to a smaller value as compared to a case where the electrical loads do not include the short-term load. In such a case, the required power excluding the power for driving the short-term load is calculated. Thus, frequent switching between the inertial traveling and the regenerative power generation due to a condition where the required power exceeds the power threshold for a short period of time can be reduced, and therefore, lowering of the drivability can be reduced.

According to a sixth aspect, the vehicle control device further includes a long-term load determination unit configured to determine whether a predetermined long-term load to be driven and used for a long period of time is included in the driven electrical loads in the vehicle deceleration state during the inertial traveling; and in a case where it is determined that the predetermined long-term load is included, the regenerative power generation is more likely to be selected as compared to a case where the predetermined long-term load is not included.

In the vehicle, the predetermined long-term load to be used for a relatively long period of time, such as the headlight or the air conditioning compressor, is included as the electrical loads. In the case of driving the long-term load, power is continuously consumed, and it is assumed that a power generation request is frequently made due to an increase in a discharge amount of the power supply unit under such a situation. In this case, there is a probability that frequent switching between the regenerative power generation and the inertial traveling occurs. In the above-described configuration, when the driven electrical loads include the predetermined long-term load during the inertial traveling, the regenerative power generation is more likely to be selected. Thus, the vehicle power generation request due to continuous use of the long-term load can be met, and frequent switching between the inertial traveling and the regenerative power generation can be reduced.

According to a seventh aspect, the required power calculation unit calculates the required power as a greater value in a case where it is determined that the predetermined long-term load is included than in a case where the predetermined long-term load is not included.

In the above-described configuration, when the driven electrical loads include the predetermined long-term load during the inertial traveling, the required power is set to a greater value as compared to a case where the predetermined long-term load is not included. In such a case, the required power is calculated as a greater value than actual required power. Thus, the regenerative power generation is more likely to be selected so that the vehicle power generation request can be met and frequent switching between the inertial traveling and the regenerative power generation can be reduced.

According to an eighth aspect, the vehicle control device further includes a history storage unit configured to store, as history information, at least any of power consumption of the vehicle during traveling and a power balance between the power consumption and power generation, and a power threshold setting unit configured to set the power threshold based on the history information.

In the above-described configuration, the power threshold is set based on the history information regarding the power consumption of the vehicle during traveling. The trend of the power consumption by a driver or the vehicle during traveling can be obtained from the history information. In such a case, the power threshold can be set as a small value for a driver showing a high power consumption trend, for example. Thus, the threshold corresponding to an operation trend of the driver or the vehicle can be set, and a travel method can be properly selected and performed.

According to a ninth aspect, the history storage unit stores, for each of multiple traveling conditions of the vehicle, at least any of the power consumption and the power balance as the history information; and the power threshold setting unit acquires the history information according to current traveling conditions of the vehicle, and sets the power threshold based on the history information.

Depending on external environment during traveling, i.e., the traveling conditions of the vehicle, the power consumption due to driving of the electrical load might vary. For example, the power consumption in driving during the night tends to be higher as compared to driving during the day due to use of the headlights. Moreover, it is assumed that the power consumption under rainy weather tends to be higher as compared to fair weather due to activation of a wiper.

In this regard, in the above-described configuration, the history information is acquired according to the current traveling conditions of the vehicle, and the power threshold is set based on the history information. In such a case, the history information corresponding to the current traveling conditions, i.e., the history information corresponding to conditions influencing the power consumption, are used for setting the power threshold. Thus, a proper value can be set as the threshold which is a reference in comparison of the level of the required power.

According to a tenth aspect, the vehicle control device further includes a required deceleration calculation unit configured to calculate a required deceleration for the vehicle in the deceleration state of the vehicle, and a deceleration threshold setting unit configured to set a predetermined deceleration threshold based on the required power in the deceleration state; and the traveling control unit selectively performs the inertial traveling or the regenerative power generation by the rotating electrical machine based on the required deceleration and the deceleration threshold.

Implementation of the inertial traveling involves the required vehicle deceleration. That is, upon determination on initiation or cancelation of the inertial traveling, the required deceleration is taken as one requirement. For example, when the required deceleration becomes higher than the deceleration threshold due to brake operation performed during the inertial traveling, the inertial traveling is canceled. In the above-described configuration, the deceleration threshold is set based on the required vehicle power in the deceleration state of the vehicle, and the inertial traveling or the regenerative power generation by the rotating electrical machine is selectively performed based on the required deceleration and the deceleration threshold. Thus, the vehicle power state can be reflected on the deceleration as a requirement regarding implementation of the inertial traveling.

According to an eleventh aspect, the traveling control unit cancels the inertial traveling to start the regenerative power generation in a case where it is determined that the required deceleration is higher than the deceleration threshold in the inertial traveling state, and maintains the inertial traveling in a case where it is determined that the required deceleration is lower than the deceleration threshold.

In the above-described configuration, the deceleration threshold is set based on the required vehicle power in the inertial traveling state. Thus, the required vehicle power can be reflected on determination on continuation or cancellation of the inertial traveling. Moreover, in comparison between the deceleration threshold and the required vehicle deceleration, in a case where the required deceleration is higher than the deceleration threshold, the inertial traveling is canceled, and the regenerative power generation is started. In such a case, switching to the regenerative power generation can reduce the power consumption of the battery, and the required vehicle deceleration can be met by a load in association with the regenerative power generation, i.e., a regenerative brake. On the other hand, in a case where the required deceleration is lower than the deceleration threshold, the inertial traveling is maintained. In this case, the inertial traveling is performed so that the travel distance can be increased. With the above-described configuration, the inertial traveling or the regenerative power generation can be properly selected and performed, and fuel consumption can be improved.

According to a twelfth aspect, the deceleration threshold setting unit sets the deceleration threshold to a smaller value as the required power increases.

In the above-described configuration, the deceleration threshold is set to a smaller value as the required power increases. In this case, the deceleration threshold is decreased in the inertial traveling state, and therefore, switching from the inertial traveling to the regenerative power generation is easily performed. Thus, the travel corresponding to the vehicle power state can be selected.

[1. Configuration]

Hereinafter, an embodiment for embodying the present disclosure will be described with reference to the drawings. In the present embodiment, inertial traveling (coasting travel) for traveling in a power blocking state of a clutch or normal traveling for traveling in a power transmission state of the clutch is selectively performed in a vehicle including an engine as a travel drive source and an integrated starter generator (ISG) capable of performing regenerative power generation. Note that the normal traveling includes travel by the regenerative power generation for regenerating kinetic energy of the vehicle.

In a vehicle 10 illustrated in FIG. 1, an engine 11 is a multicylinder internal-combustion engine to be driven by combustion of fuel such as gasoline or light oil, and as necessary, includes a fuel injection valve, an ignition device, etc. as is well known. An ISG 13 as a power generator is provided integrally with the engine 11, and a rotary shaft of the ISG 13 is drivably coupled to an engine output shaft 12 via a belt etc. In this case, the rotary shaft of the ISG 13 is rotated by rotation of the engine output shaft 12, whereas the engine output shaft 12 is rotated by rotation of the rotary shaft of the ISG 13. That is, the ISG 13 has the power generation function of generating power (the regenerative power generation) by rotation of the engine output shaft 12, and the power output function of providing the engine output shaft 12 with rotative force. Upon engine start-up, initial rotation (cranking rotation) is provided to the engine 11 by rotation of the ISG 13.

An in-vehicle battery 14 as a power supply unit is electrically connected to the ISG 13. In this case, the ISG 13 is driven by power supplied from the battery 14, and the battery 14 is charged with the power generated by the ISG 13. Electrical loads 15 mounted on the vehicle are electrically connected to the battery 14, and the power of the battery 14 is used for driving the electrical loads 15. The electrical loads 15 include, for example, an electric power steering 15a, a radiator fan 15b, a headlight 15c, and an air conditioning compressor 15d.

In addition to the ISG 13, an accessory 18 such as a water pump or a fuel pump is, as a drive target device to be driven by rotation of the engine output shaft 12, mounted on the vehicle 10. Note that other drive target devices may be included. The drive target devices include not only one drivably coupled to the engine 11 via a belt etc., but also one directly connected to the engine output shaft 12 and one disconnected from or connected to the engine output shaft 12 by a clutch section.

A transmission 20 is connected to the engine output shaft 12 via a clutch device 19 having a power transmission function. The clutch device 19 is, for example, a friction clutch, and includes a clutch mechanism set having an engine-11-side circular plate (e.g., a flywheel) connected to the engine output shaft 12 and a transmission-20-side circular plate (e.g., a clutch disc) connected to a transmission input shaft 21. In the clutch device 19, both circular plates come into contact with each other to cause the power transmission state (a clutch connection state) in which power is transmitted between the engine 11 and the transmission 20, and are separated from each other to cause the power blocking state (a clutch disconnection state) in which power transmission between the engine 11 and the transmission 20 is blocked. The clutch device 19 of the present embodiment is configured as an automatic clutch configured to switch the clutch connection/disconnection state by an actuator such as a motor. Note that it may be configured such that the clutch device 19 is provided inside the transmission 20.

The transmission 20 is, for example, a continuously variable transmission (CVT) or a multistage transmission having multiple gear positions. The transmission 20 is configured to shift the power of the engine 11 input from the transmission input shaft 21 at a gear ratio corresponding to a vehicle speed or an engine speed, thereby outputting the resultant power to a transmission output shaft 22.

Vehicle wheels 27 are connected to the transmission output shaft 22 via a differential gear 25 and a drive shaft 26 (a vehicle drive shaft). Moreover, the vehicle wheels 27 each include brake devices 28 to be driven by not-shown hydraulic circuits etc. to provide the vehicle wheels 27 with brake force. Each brake device 28 is configured to adjust the brake force for the vehicle wheel 27 according to the pressure of a not-shown master cylinder configured to transmit force on a brake pedal to operating oil.

Moreover, the present system includes, as in-vehicle control sections, an engine ECU 31 configured to control an operation state of the engine 11, and a transmission ECU 32 configured to control the clutch device 19 and the transmission 20. Each of these ECUs 31, 32 is a well-known electronic control device including a microcomputer, various memories, etc., and as necessary, controls the engine 11, the transmission 20, etc. based on detection results of various sensors provided at the present system. The ECUs 31, 32 are communicably connected to each other, and therefore, can share a control signal, a data signal, etc. Note that the present embodiment has, but is not limited to, such a configuration that two ECUs 31, 32 are provided and the engine ECU 31 of these ECUs 31, 32 forms a "vehicle control device," but two or more ECUs may form the vehicle control device, for example.

Note that in the memory of the engine ECU 31, history information such as power consumption and a power balance between the power consumption and power generation in a previous drive cycle, i.e., a period from ignition ON to ignition OFF, is stored for each of various traveling conditions. The traveling conditions, i.e., external environment during traveling, include time conditions such as the daytime or the night, weather conditions such as fair weather or rainy weather, and conditions regarding an air temperature such as an air temperature level, for example. Note that each of these conditions is stored as a combination of multiple conditions.

Sensors are provided, the sensors including, for example, an accelerator sensor 41 configured to detect a stepping-on amount (an accelerator operation amount) of an accelerator pedal as an accelerator operation member, a brake sensor 42 configured to detect a stepping-on amount (a brake operation amount) of the brake pedal as a brake operation member, a vehicle speed sensor 43 configured to detect the vehicle speed, an inclination angle sensor 44 configured to detect an inclination angle of the vehicle 10 with respect to a road surface, a rotation speed sensor 45 configured to detect the engine speed, a brake pressure sensor 46 configured to detect the pressure of the master cylinder, and a battery sensor 47 configured to detect the state of the battery 14 and a detection signal of each of these sensors being sequentially input to the engine ECU 31. Note that the battery sensor 47 includes, for example, a current sensor configured to detect current (charge/discharge current) flowing out of or flowing in the battery 14, a voltage sensor configured to detect the inter-terminal voltage of the battery 14, and a temperature sensor configured to detect the temperature of the battery 14. In addition, the present system includes, for example, a load sensor (an air flow meter, an intake pressure sensor) configured to detect an engine load, a coolant temperature sensor, an external air temperature sensor, and an atmospheric pressure sensor, but these sensors are not shown in the figure.

The engine ECU 31 is configured to perform, based on, e.g., the detection results of various sensors, various types of engine control such as control of a fuel injection amount of the fuel injection valve and control of ignition by the ignition device, control of engine start-up, engine torque assist, and power generation by the ISG 13, and control of braking by the brake devices 28. Moreover, the transmission ECU 32 is configured to perform disconnection/connection control of the clutch device 19 and gear shift control of the transmission 20 based on, e.g., the detection results of various sensors.

The vehicle 10 of the present embodiment has the function of performing the inertial traveling in the disconnection state of the clutch device 19 under a condition where the vehicle 10 is traveling by operation of the engine 11 and the function of generating power by regeneration of the kinetic energy, and performs these functions to improve fuel consumption. The engine ECU 31 has a control function regarding the inertial traveling, and performs switching between the normal traveling state in which the vehicle 10 is traveling with the engine 11 being in an activation state and the clutch device 19 being in the connection state (a clutch-ON state)

and the inertial traveling state in which the vehicle 10 is coasting with the engine 11 being in a deactivation state and the clutch device 19 being in the disconnection state (a clutch-OFF state). In the normal traveling state, the engine ECU 31 generates power according to, e.g., the SOC of the battery 14, as necessary.

Note that in addition to the configuration in which the engine 11 is brought into the deactivation state and the clutch device 19 is brought into the disconnection state in the inertial traveling state, it may be configured such that the engine 11 is brought into the activation state (e.g., an idling state) and the clutch device 19 is brought into the disconnection state in the inertial traveling state. In this case, the engine 11 may remain in the activation state in preparation for, e.g., subsequent re-acceleration under the clutch-OFF state, and at this point, may be maintained in the idling rotation state to save fuel.

In this case, during the normal traveling of the vehicle 10, the engine ECU 31 brings the clutch device 19 into the disconnection state (the OFF state) and brings the vehicle 10 into the inertial traveling state according to satisfaction of predetermined inertial traveling implementation conditions including accelerator conditions and brake conditions. Note that the inertial traveling implementation conditions may include, for example, a condition where the engine speed is stable at equal to or higher than a predetermined value (e.g., equal to or higher than an idling speed), a condition where the vehicle speed is within a predetermined range (e.g., 20 to 120 km/h), and a condition where a road surface slope (inclination) is within a predetermined range. Moreover, during the inertial traveling of the vehicle 10, the engine ECU 31 brings the clutch device 19 into the connection state (the ON state) and cancels the inertial traveling state according to satisfaction of predetermined cancellation conditions including accelerator conditions and brake conditions. At this point, the inertial traveling state may be canceled in association with non-satisfaction of the inertial traveling implementation conditions.

The inertial traveling is a technique used for traveling with loss of kinetic energy of a vehicle being reduced as much as possible. For example, in normal traveling, engine braking due to, e.g., friction of an engine is applied to the vehicle, and therefore, a clutch between a power transmission path and the engine as a power source is disconnected so that loss of the kinetic energy can be reduced. However, in a state in which the inertial traveling is being performed, the kinetic energy of the vehicle is preferably directly used for traveling, and therefore, the regenerative power generation for converting the kinetic energy into electrical energy is stopped. As a result, the opportunities for regenerative power generation are reduced due to implementation of the inertial traveling.

For this reason, in the present embodiment, the engine ECU 31 brings the clutch device 19 into the disconnection state to perform the inertial traveling of the vehicle 10 according to satisfaction of the predetermined inertial traveling implementation conditions, and brings the clutch device 19 into the connection state to cancel the inertial traveling state and perform the regenerative power generation according to satisfaction of predetermined regenerative power generation implementation conditions during the inertial traveling. Specifically, the inertial traveling or the regenerative power generation is selectively performed based on required vehicle power calculated in a state in which the inertial traveling implementation conditions are satisfied.

More specifically, when the vehicle 10 is, for example, in the inertial traveling state, determination of whether the inertial traveling is maintained or is switched to the regenerative power generation is made based on required vehicle power W in a state in which the inertial traveling implementation conditions are satisfied. Moreover, when the vehicle 10 is in the normal traveling (non-inertial traveling) state, determination of whether the inertial traveling or the regenerative power generation is executed is made based on the required vehicle power W in a state in which the inertial traveling implementation conditions are satisfied. Note that determination of whether the inertial traveling or the regenerative power generation is selected is made based on the required vehicle power W and a power threshold A. The regenerative power generation can be preferentially selected in the case of high required vehicle power W, and the inertial traveling can be preferentially selected in the case of low required vehicle power W.

As described above, in the present embodiment, the engine ECU 31 has a required power calculation unit 33 configured to calculate the required vehicle power, and a traveling control unit 34 configured to selectively perform the inertial traveling or the regenerative power generation based on the required power.

The required vehicle power W is calculated based on power consumption of the electrical load 15 during driving thereof, for example. The power consumption of the electrical load 15 also constantly changes during traveling in association with, e.g., ON/OFF switching of the electrical load 15. The electrical loads 15 described herein include one constantly activated during operation, and one activated according to an operation state thereof. Further, it is assumed that the electrical loads 15 activated according to the operation state include an electrical load (i.e., a long-term load) for which long-term use is predicted in a drive cycle, and an electrical load (i.e., a short-term load) for which short-term use is predicted. For example, for the electrical loads 15 such as the headlight 15$c$ and the air conditioning compressor 15$d$, long-term use, i.e., use for a long period of time in the drive cycle, is predicted. On the other hand, for the electrical loads 15 such as the electric power steering 15$a$ and the radiator fan 15$b$, it is predicted that temporal use, i.e., activation time per driving, is short (e.g., within one minute).

It is assumed that in a case where temporary ON/OFF switching of the short-term load occurs, the power consumption of the electrical load 15 fluctuates in a short cycle. In such a case, when the required power W fluctuates across the power threshold A, switching between the state of performing the inertial traveling and the state of performing the regenerative power generation is frequently made. As a result, there is a concern that, e.g., lowering of drivability occurs.

For this reason, in the present embodiment, in a case where the driven electrical loads 15 include the short-term load in the inertial traveling state, the inertial traveling is more likely to be selected. Specifically, in a case where the electric power steering 15$a$ etc. are driven as the short-term loads, the power consumption of the electrical loads 15 excluding these short-term loads is taken as the required power W. That is, the power for driving the short-term loads is taken as temporary, and is not taken into consideration on the required power W. Thus, fluctuation in the power consumption of the electrical load 15 in association with ON/OFF switching of the short-term load can be reduced.

Moreover, in the present embodiment, in a case where the driven electrical loads 15 include the long-term load, the regenerative power generation is more likely to be selected.

Specifically, in a case where the headlights 15*c* etc. are driven as the long-term loads, a value (e.g., a value increased by 10%) estimated to be large, as compared to actual power consumption is calculated as the required power W. Thus, the vehicle power generation request due to continuous use of the long-term load can be met, and frequent switching between the inertial traveling and the regenerative power generation can be reduced.

A drive status of the electrical load 15 during traveling varies according to a driver or a vehicle. For example, there is a driver who activates an air conditioner with high power or activates audio equipment with a high sound volume, whereas there is a driver who uses the electrical load 15 very little. For this reason, determination on the inertial traveling and the regenerative power generation is more preferably made in association with a usage trend of the electrical load 15 in an individual driver or vehicle, i.e., the trend of power consumption during traveling.

Thus, in the present embodiment, the power threshold A to be compared with the required power W is set based on the history information. The history information is information regarding vehicle power in the previous drive cycle for each traveling condition, i.e., the power consumption during traveling and the power balance between the power consumption and the power generation, for example. For example, in a case where it is, from the history information, determined as a driver or a vehicle with high power consumption, the power threshold is set such that the regenerative power generation is more likely to be selected. Specifically, the power threshold is set as a small value. On the other hand, in a case where it is determined as a driver or a vehicle with low power consumption, the power threshold is set such that the inertial traveling is more likely to be selected. Specifically, the power threshold is set as a great value.

For availability of implementation of the inertial traveling, a required vehicle deceleration is also determined. In a case where the vehicle 10 is coasting in an accelerator-OFF clutch-OFF state, the vehicle speed relatively gradually decreases. The deceleration at this point is a value corresponding to the vehicle speed, and exhibits a deceleration characteristic shown as a clutch-OFF characteristic XA in FIG. 2, for example. In such a state, a gradual deceleration state in which deceleration is mainly made due to vehicle travel resistance without engine braking is used. Note that in FIG. 2, the deceleration is provided as a negative value of an acceleration.

Figure 2:
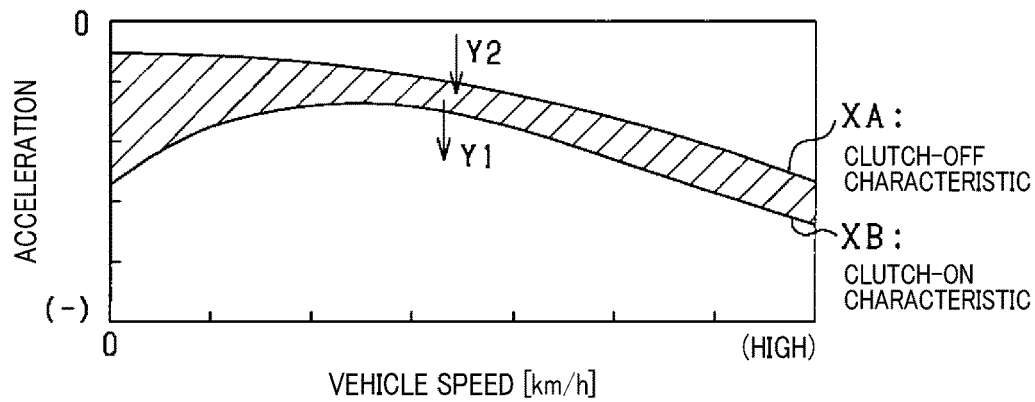
FIG. 2 is a graph of deceleration characteristics according to a vehicle speed.

On the other hand, in a case where the vehicle 10 is normally traveling in an accelerator-OFF clutch-ON state, the deceleration increases as compared to that upon the inertial traveling, and exhibits a deceleration characteristic shown as a clutch-ON characteristic XB in FIG. 2, for example. In other words, while the vehicle is traveling with the accelerator being OFF, the driver feels the deceleration with the characteristic XA when the clutch is OFF, and feels the deceleration with the characteristic XB when the clutch is ON. Note that the characteristics of FIG. 2 are set based on an assumption that the CVT is used as the transmission 20, considering that the gear ratio of the CVT is switched according to the vehicle speed. Moreover, upon implementation of the inertial traveling, the decelerations with the clutch-ON characteristic XB and the clutch-OFF characteristic XA can be set as deceleration thresholds.

For example, in the inertial traveling state of the vehicle 10, i.e., in a range between the characteristic XA and the characteristic XB in FIG. 2, in a case where the required vehicle deceleration is satisfied in the gradual deceleration state by the inertial traveling, the inertial traveling is maintained. That is, in such a case, braking force by the brake devices 28 is not necessary. On the other hand, when the inertial traveling is performed, if the braking force is necessary due to, e.g., narrowing of an inter-vehicle distance to a vehicle ahead, the driver performs brake operation. In such a case, the required deceleration exceeds the deceleration shown by the clutch-ON characteristic XB such that the inertial traveling is cancelled. That is, in this case, a state change indicated by Y1 in FIG. 2 is made, and deceleration by inertial traveling no longer satisfies the required vehicle deceleration. On the other hand, in a case where the vehicle 10 starts decelerating during normal traveling, when the deceleration thereof becomes a great value to a certain extent, the normal traveling transitions to the inertial traveling. In this case, a state change indicated by Y2 in FIG. 2 is made.

In the present embodiment, the deceleration threshold used for determination on implementation of the inertial traveling is set based on the required vehicle power W. Specifically, in the inertial traveling state, the deceleration threshold is set to a smaller value as the required vehicle power W increases. The inertial traveling is maintained in a case where the required vehicle deceleration is lower than the deceleration threshold, and is switched to the regenerative power generation in a case where the required vehicle deceleration is higher than the deceleration threshold. In such a case, in a state in which the required power W is high, switching from the inertial traveling to the regenerative power generation is easily performed. Further, by action of a load in association with the regenerative power generation, i.e., action of regenerative brake, the required vehicle deceleration can be met.

On the other hand, in the normal traveling state, the deceleration threshold is set to a greater value as the required vehicle power W increases. The inertial traveling is performed in a case where the required vehicle deceleration is higher than the deceleration threshold, and the regenerative power generation is performed in a case where the required vehicle deceleration is lower than the deceleration threshold. In such a case, in a state in which the required power W is high, the regenerative power generation is more likely to be performed as compared to the inertial traveling.

[2. Processing]

Next, the processing of determining permission of the inertial traveling based on the required vehicle power W will be described with reference to a flowchart of FIG. 3. The present processing is repeatedly performed in a predetermined cycle by the engine ECU 31. Note that in the present embodiment, required power in association with driving of the electrical load 15, i.e., the power consumption of the electrical load 15, is used as the required vehicle power W.

Figure 3:
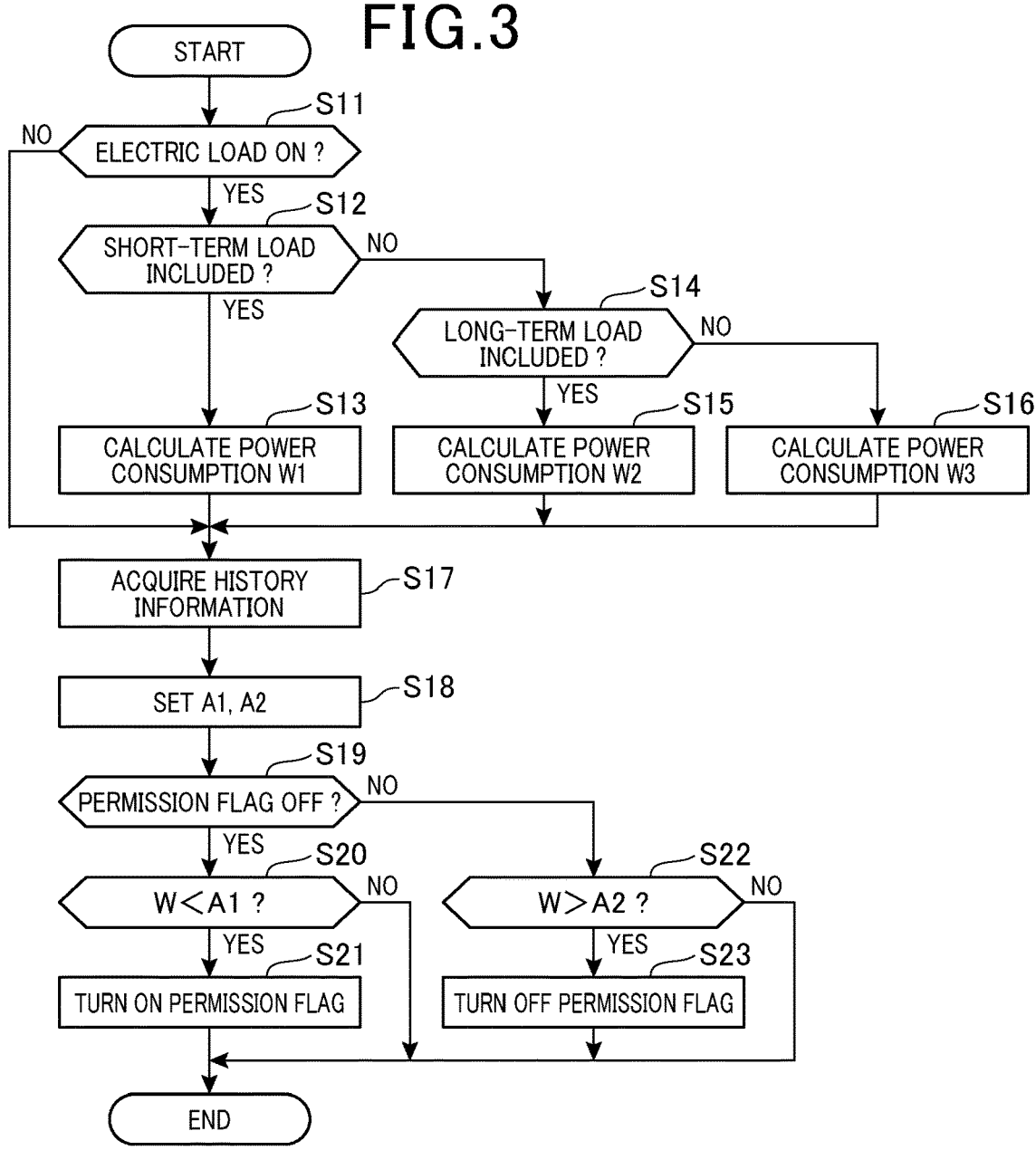
FIG. 3 is a flowchart of the processing of determining permission of inertial traveling.

In FIG. 3, at step S11, it is first determined whether the electrical loads 15 are driven. The processing proceeds to step S12 if the determination result of step S11 is YES, i.e. the electrical loads 15 are driven, and proceeds to step S15 if the determination result of step S11 is NO, i.e. the electrical loads 15 are not driven. At step S12, it is determined whether the driven electrical load 15 includes any short-term loads. That is, it is determined whether the short-term load such as the electric power steering 15*a* or the radiator fan 15*b* is driven. Then, if the determination result of step S12 is YES, i.e. the driven electrical load 15 includes any short-term loads, the processing proceeds to step S13, and the power consumption W1 of the electrical loads 15 excluding the short-term load from the driven electrical loads 15 is calculated. For example, power consumption before driving of the short-term load is started is calculated as the power consumption W1 during driving of the short-term load.

On the other hand, if the determination result of step S12 is NO, i.e. the driven electrical load 15 does not include any short-term loads, then the processing proceeds to step S14, and it is determined whether the driven electrical load 15 includes any long-term loads. That is, it is determined whether the long-term load such as the headlight 15c or the air conditioning compressor 15d is driven. Then, if the determination result of step S14 is YES, i.e. the driven electrical load 15 includes any long-term loads, the processing proceeds to step S15, and the value (e.g., the value increased by 10%) estimated to be large, as compared to the actual power consumption is calculated as power consumption W2. Upon calculation of the power consumption W2, the power consumption W2 is, for example, obtained by performing arithmetic processing for an actual power consumption value by means of a predetermined coefficient.

Note that step S12 corresponds to a "short-term load determination unit," and step S14 corresponds to a "long-term load determination unit."

On the other hand, if the determination result of step S14 is NO, i.e. the driven electrical load 15 does not include any long-term loads, then the processing proceeds to step S16, and the actual power consumption of the driven electrical loads 15 is calculated as power consumption W3. The actual power consumption is calculated based on a current value detected by the battery sensor 47 provided at the battery 14, for example. Note that the required vehicle power W is higher as the power consumption of the electrical loads 15 increases. At the following steps described herein, any one of the power consumptions W1, W2, W3 calculated at steps S13, S15, S16 is used as the required vehicle power W. That is, step S13, S15, S16 corresponds to a "required power calculation unit."

At a subsequent step S17, the history information regarding vehicle power in the previous drive cycle is acquired. For example, the power consumption during traveling is used as the history information. Moreover, in this case, the history information under the same environment as travel environment at a current point is acquired. That is, the vehicle traveling conditions at the current point are analyzed, and the previous travel history information corresponding to these traveling conditions is acquired.

For example, it is assumed that power consumption in driving during the night is higher as compared to driving during the day due to use of the headlights 15c. Moreover, it is assumed that power consumption under rainy weather is higher as compared to fair weather due to activation of a wiper. As described above, the power consumption due to driving of the electrical load 15 varies according to the external environment upon driving. Thus, the history information under environment corresponding to the conditions is preferably used.

Note that the history information acquired at step S17 is stored in the memory of the engine ECU 31. The processing of storing the history information will be described herein with reference to a flowchart of FIG. 4. The present processing is repeatedly performed in a predetermined cycle by the engine ECU 31 under an ignition-ON status, i.e., a vehicle traveling status. First, at step S101, the traveling conditions of the vehicle 10 are acquired. The traveling conditions include, for example, a time period such as the night or the daytime, and weather such as rainy weather or fair weather. At step S102, the power consumption based on driving of the electrical loads 15 is acquired. The power consumption is calculated based on the current value detected by the battery sensor 47, for example. At step S103, the power consumption for each traveling condition is stored as the history information. The step S103 described herein corresponds to a "history storage unit."

Figure 4:
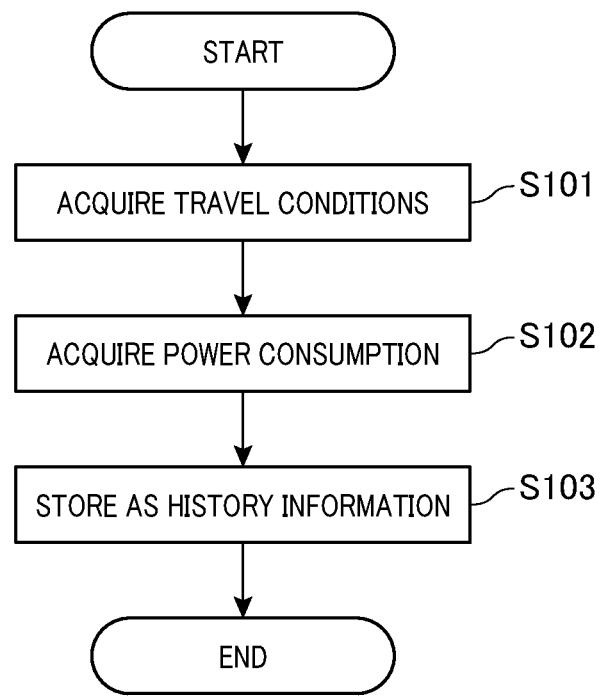
FIG. 4 is a flowchart of the processing storing history information.

Note that at step S102 of FIG. 4, it may be configured such that the power balance between the power consumption during traveling and the power generation is acquired instead of acquiring the power consumption. The power balance can be calculated by comparison between a remaining battery capacity (SOC) upon ignition ON and a battery SOC upon ignition OFF. In this case, it can be said that the power consumption tends to be high in the case of decreasing the battery SOC due to traveling and tends to be low in the case of increasing the battery SOC.

Figure 5:
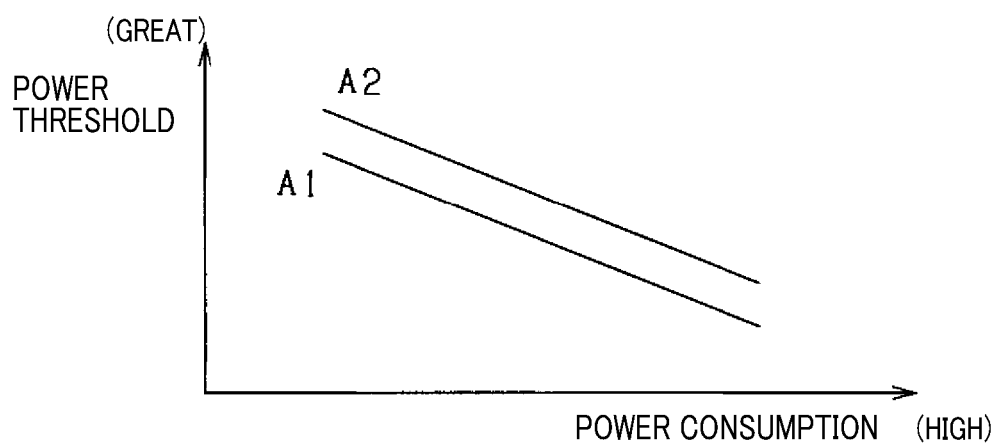
FIG. 5 is a graph showing a relationship among power consumption and power thresholds.

Subsequently, the processing proceeds to step S18, and power thresholds A1, A2 are set based on the history information. In this case, A1 for determining permission of the inertial traveling and A2, which is greater than A1, for determining permission of the regenerative power generation are set as the power thresholds. Note that hysteresis is provided between these thresholds. The values of the power thresholds A1, A2 and the power consumption based on the history information as described herein are in a correlation illustrated in FIG. 5, for example. That is, the power thresholds A1, A2 are set as smaller values as the power consumption increases. In other words, the thresholds are set such that the regenerative power generation is more likely to be selected in the case of a driver showing a high power consumption trend, and are set such that the inertial traveling is more likely to be selected in the case of a driver showing a low power consumption trend. Note that step S18 corresponds to a "power threshold setting unit."

At step S19, it is determined whether a permission flag indicating permission of implementation of the inertial traveling is OFF. If the determination result of step S19 is YES, i.e. the permission flag is OFF, then the processing proceeds to step S20, and it is determined whether the required power W is lower than the power threshold A1. The processing proceeds to step S21 to turn ON the permission flag if the determination result of step S20 is YES, i.e. the required power W is lower than the power threshold A1, and ends if the determination result of step S20 is NO, i.e. the required power W is not lower than the power threshold A1. On the other hand, if the determination result of step S19 is NO, i.e. the permission flag is not OFF, then the processing proceeds to step S22, and it is determined whether the required power W is higher than the power threshold A2. The processing proceeds to step S23 to turn OFF the permission flag if the determination result of step S22 is YES, i.e. the required power W is higher than the power threshold A2, and ends if the determination result of step S22 is NO, i.e. the required power W is not higher than the power threshold A2.

Note that a configuration in which the inertial traveling is permitted while the regenerative power generation is being performed and the regenerative power generation is permitted during the inertial traveling is being performed may be employed in the permission determination processing. Specifically, by determination of whether the regenerative power generation or the inertial traveling is being performed, the inertial traveling may be permitted in a case where it is determined that the required power W is lower than the power threshold A1 in the state of performing the regenerative power generation, and the regenerative power generation may be permitted in a case where it is determined that the required power W is higher than the power threshold A2 in the state of performing the inertial traveling.

Next, traveling control processing by the vehicle control device in the present disclosure will be described with reference to a flowchart of FIG. 6. The present processing is repeatedly performed in a predetermined cycle by the engine ECU 31.

Figure 6:
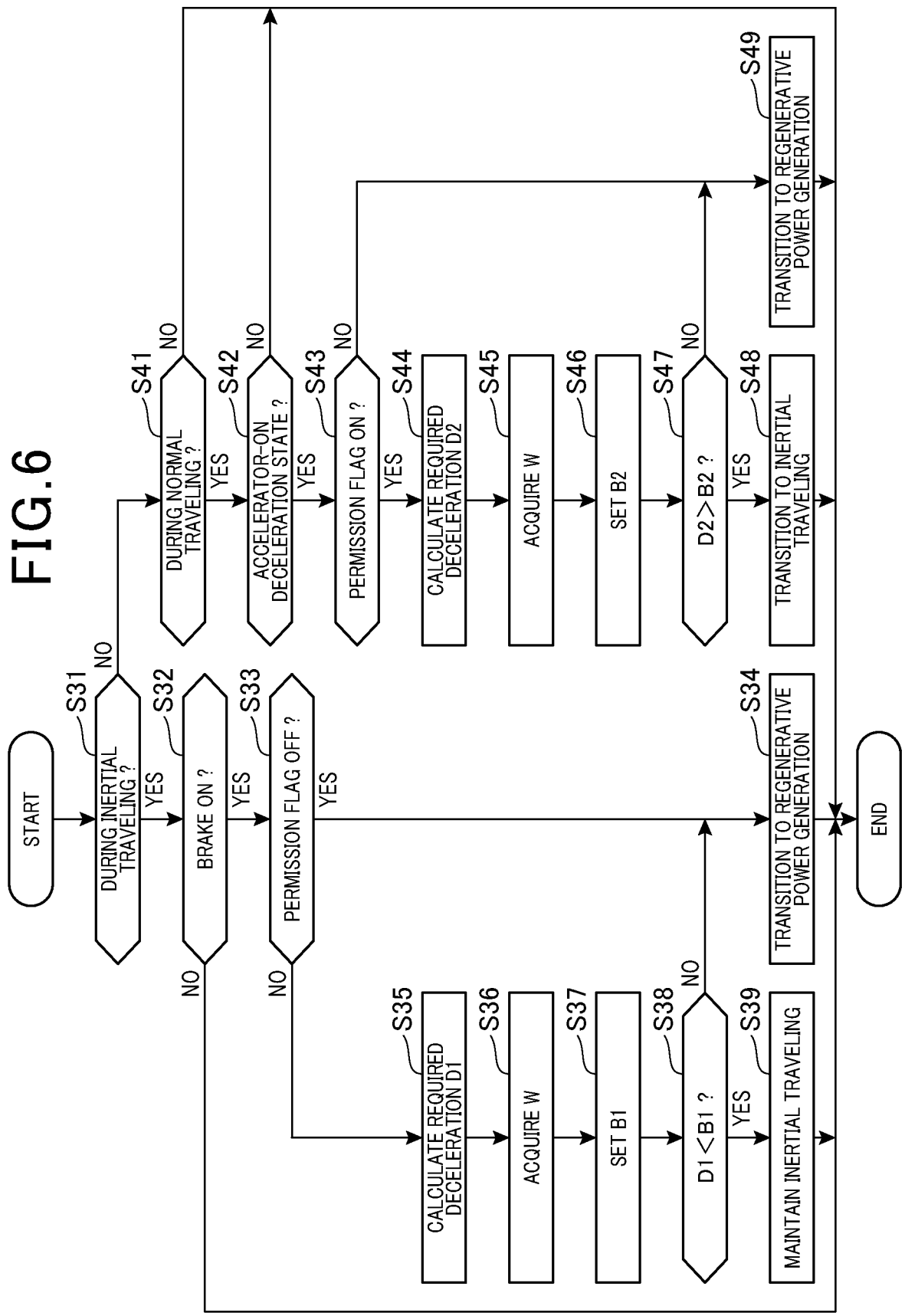
FIG. 6 is a flowchart of traveling control processing.

In FIG. 6, by determination at step S31 on whether the vehicle 10 is currently in the clutch-OFF inertial traveling state, the processing proceeds to step S32 if the determination result of step S31 is YES, i.e. the vehicle 10 is in the clutch-OFF inertial traveling state, and proceeds to step S41 if the determination result of step S31 is NO, i.e. the vehicle 10 is not in the clutch-OFF inertial traveling state. At step S32, it is determined whether a brake-ON state is brought. The brake-ON state is determined based on a condition where the brake operation amount detected by the brake sensor 42 is greater than zero, for example. The processing proceeds to step S33 if the determination result of step S32 is YES, i.e. the brake-ON state is brought, and ends if the determination result of step S32 is NO, i.e. the brake-ON state is not brought.

At step S33, it is determined whether the permission flag in the processing of FIG. 3 is OFF. If the determination result of step S33 is YES, i.e. the permission flag is OFF, then the processing proceeds to step S34 to transition to the regenerative power generation. That is, in this case, the required vehicle power W is high, and therefore, switching from the inertial traveling to the regenerative power generation is executed.

Figure 7:
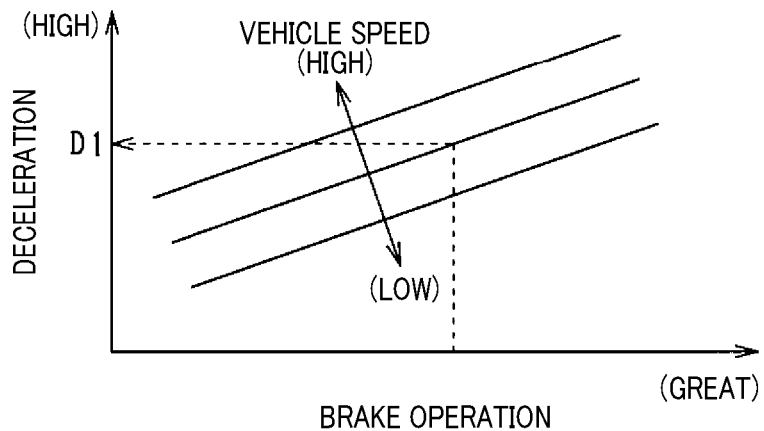
FIG. 7 is a graph showing a relationship between a brake operation amount and a deceleration.

On the other hand, if the determination result of step S33 is NO, i.e. the permission flag is not OFF, then the processing proceeds to step S35, and a required vehicle deceleration D1 in association with, e.g., the brake operation is calculated. Specifically, the required deceleration D1 is calculated using a relationship of FIG. 7. In FIG. 7, a relationship among the brake operation amount, the vehicle speed, and the deceleration is set, and the required deceleration D1 is calculated based on the brake operation amount (the brake pedal stepping-on amount) detected by the brake sensor 42. In this case, a higher value is calculated as the required deceleration D1 as the brake operation amount or the vehicle speed increases.

Figure 8:
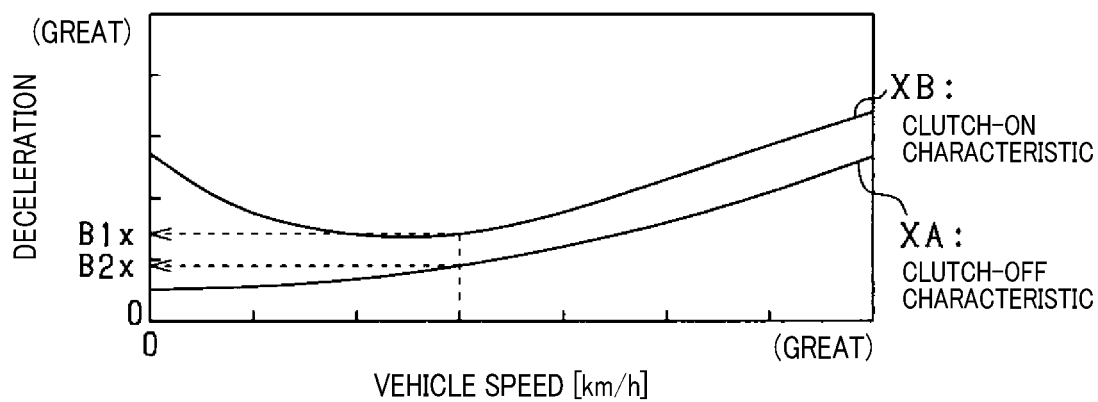
FIG. 8 is a graph showing the deceleration characteristics according to the vehicle speed.

At a subsequent step S36, the required power W calculated in the processing of FIG. 3 is acquired. Subsequently, the processing proceeds to step S37, and a deceleration threshold B1 is set based on the required power W. Upon calculation of the deceleration threshold B1 as described herein, a reference value $B1x$ is first set based on the vehicle deceleration in the accelerator-OFF clutch-ON state, for example. Specifically, the reference value $B1x$ is calculated using correlation data illustrated in FIG. 8. FIG. 8 illustrates characteristics XA, XB similar to those of FIG. 2, and for the sake of convenience, the vertical axis indicates the "deceleration." In this case, the clutch-ON characteristic XB of FIG. 8 corresponds to correlation data showing a correlation between the vehicle deceleration and the vehicle speed in the accelerator-OFF clutch-ON state, and the reference value $B1x$ is calculated based on a current vehicle speed by means of the correlation data. Note that the reference value $B1x$ is calculated as a higher deceleration value than a later-described reference value $B2x$.

Figure 9:
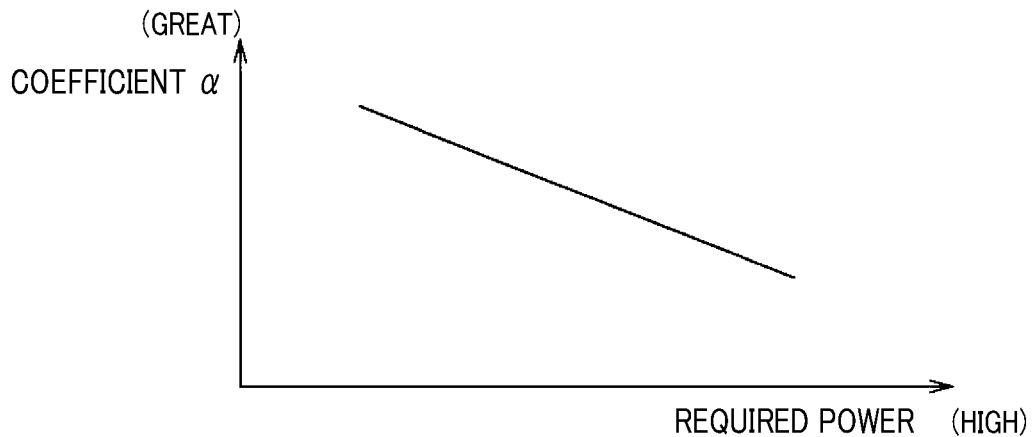
FIG. 9 is a graph showing a relationship between required power and a coefficient $\alpha$.

Then, the threshold B1 is calculated in such a manner that arithmetic processing is performed for the resultant reference value $B1x$ by means of a correction value (e.g., a coefficient α). The coefficient α and the required power W as described herein are in a correlation as illustrated in FIG. 9, for example. As seen from FIG. 9, the coefficient α is calculated as a smaller value as the required power W increases. Thus, the deceleration threshold B1 is calculated as a smaller value as the required power W increases, and as a result, switching to the regenerative power generation is more likely to be executed.

Subsequently, the processing proceeds to step S38, and it is determined whether the required deceleration D1 is lower than the threshold B1. It is determined that the inertial traveling is maintained if the determination result of step S38 is YES, i.e. the required deceleration D1 is lower than the threshold B1, and it is determined that the inertial traveling is canceled and transitions to the regenerative power generation if the determination result of step S38 is NO, i.e. the required deceleration D1 is not lower than the threshold B1.

At step S41, it is determined whether the vehicle 10 is currently in the clutch-ON normal traveling state, and the processing proceeds to step S42 if the determination result of step S41 is YES, i.e. the vehicle 10 is in the clutch-ON normal traveling state. At step S42, it is determined whether the vehicle is an accelerator-ON deceleration state. The accelerator-ON state is determined based on a condition where the accelerator operation amount detected by the accelerator sensor 41 is greater than zero. The deceleration state of the vehicle is determined based on a state in which the vehicle speed detected by the vehicle speed sensor 43 decreases. If the determination result of step S42 is YES, i.e. the vehicle is the accelerator-ON deceleration state, then the processing proceeds to step S43.

At step S43, it is determined whether the permission flag in the processing of FIG. 3 is ON. If the determination result of step S43 is YES, i.e. the permission flag is ON, then the processing proceeds to step S44. On the other hand, if the determination result of step S43 is NO, i.e. the permission flag is not ON, then the processing proceeds to step S49 to execute the regenerative power generation. That is, in this case, the required vehicle power W is high, and therefore, execution of the regenerative power generation is selected.

Figure 10:
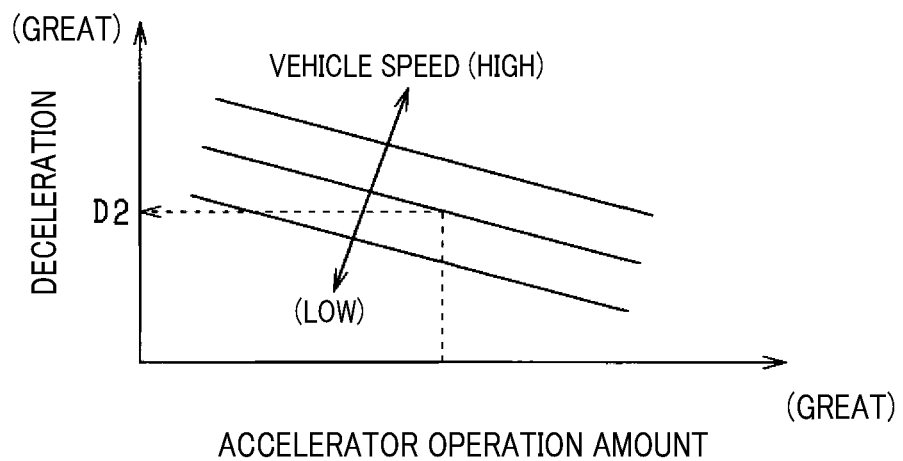
FIG. 10 is a graph showing a relationship between an accelerator operation amount and the deceleration.

At step S44, a required vehicle deceleration D2 in association with a decrease in the driver's accelerator operation amount is calculated. Specifically, the required deceleration D2 is calculated using a relationship of FIG. 10. In FIG. 10, a relationship among the accelerator operation amount, the vehicle speed, and the deceleration is set, and the required deceleration D2 is calculated based on the accelerator operation amount (the accelerator pedal stepping-on amount) detected by the accelerator sensor 41 and the vehicle speed. In this case, a higher value is calculated as the required deceleration D2 as the accelerator operation amount decreases or the vehicle speed increases.

At a subsequent step S45, the required power W calculated in the processing of FIG. 3 is acquired. Subsequently, the processing proceeds to step S46, and a deceleration threshold B2 is set based on the required power W. Upon calculation of the deceleration threshold B2 as described herein, the reference value $B2x$ is first set based on the vehicle deceleration in the accelerator-OFF clutch-OFF state, for example. Specifically, the reference value $B2x$ is calculated using the correlation data illustrated in FIG. 8. In this case, the clutch-OFF characteristic XA of FIG. 8 corresponds to correlation data showing a correlation between the vehicle deceleration and the vehicle speed in the accelerator-OFF clutch-OFF state, and the reference value $B2x$ is calculated based on the current vehicle speed by means of the correlation data.

Figure 11:
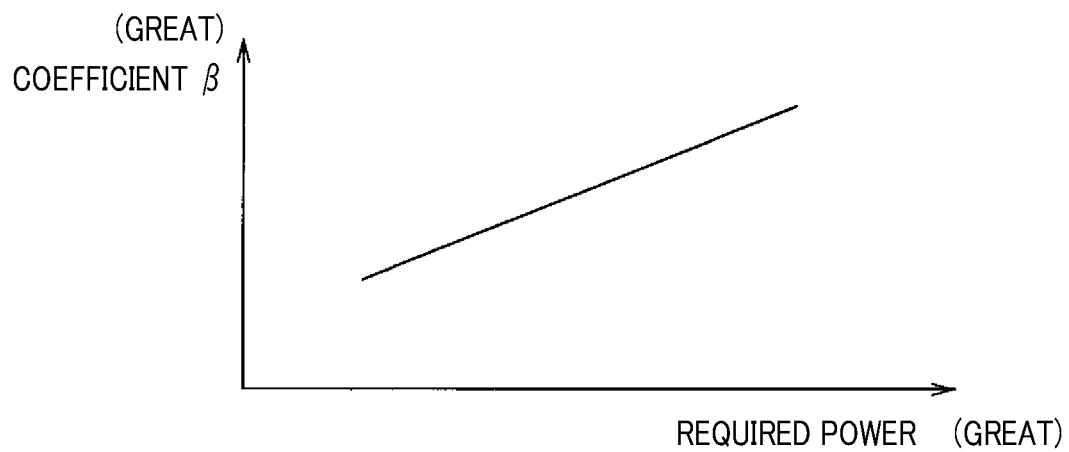
FIG. 11 is a graph showing a relationship between the required power and a coefficient $\beta$.

Then, the threshold B2 is calculated in such a manner that arithmetic processing is performed for the resultant reference value $B2x$ by means of a correction value (e.g., a coefficient β). The coefficient β and the required power W as described herein are in a correlation shown in FIG. 11, for example. As seen from FIG. 11, the coefficient β is calculated as a greater value as the required power W increases. Thus, the deceleration threshold B2 is calculated as a greater value as the required power W increases, and as a result, the regenerative power generation is more likely to be selected as compared to the inertial traveling.

Subsequently, the processing proceeds to step S47, and it is determined whether the required deceleration D2 is higher than the deceleration threshold B2. It is determined that the inertial traveling is to be started if the determination result of step S47 is YES, i.e. the required deceleration D2 is higher than the deceleration threshold B2, and it is determined that the regenerative power generation is to be started if the determination result of step S47 is NO, i.e. the required deceleration D2 is not higher than the deceleration threshold B2.

Note that step S35, S44 corresponds to a "required deceleration calculation unit," and step S37, S46 corresponds to a "deceleration threshold setting unit."

Figure 12:
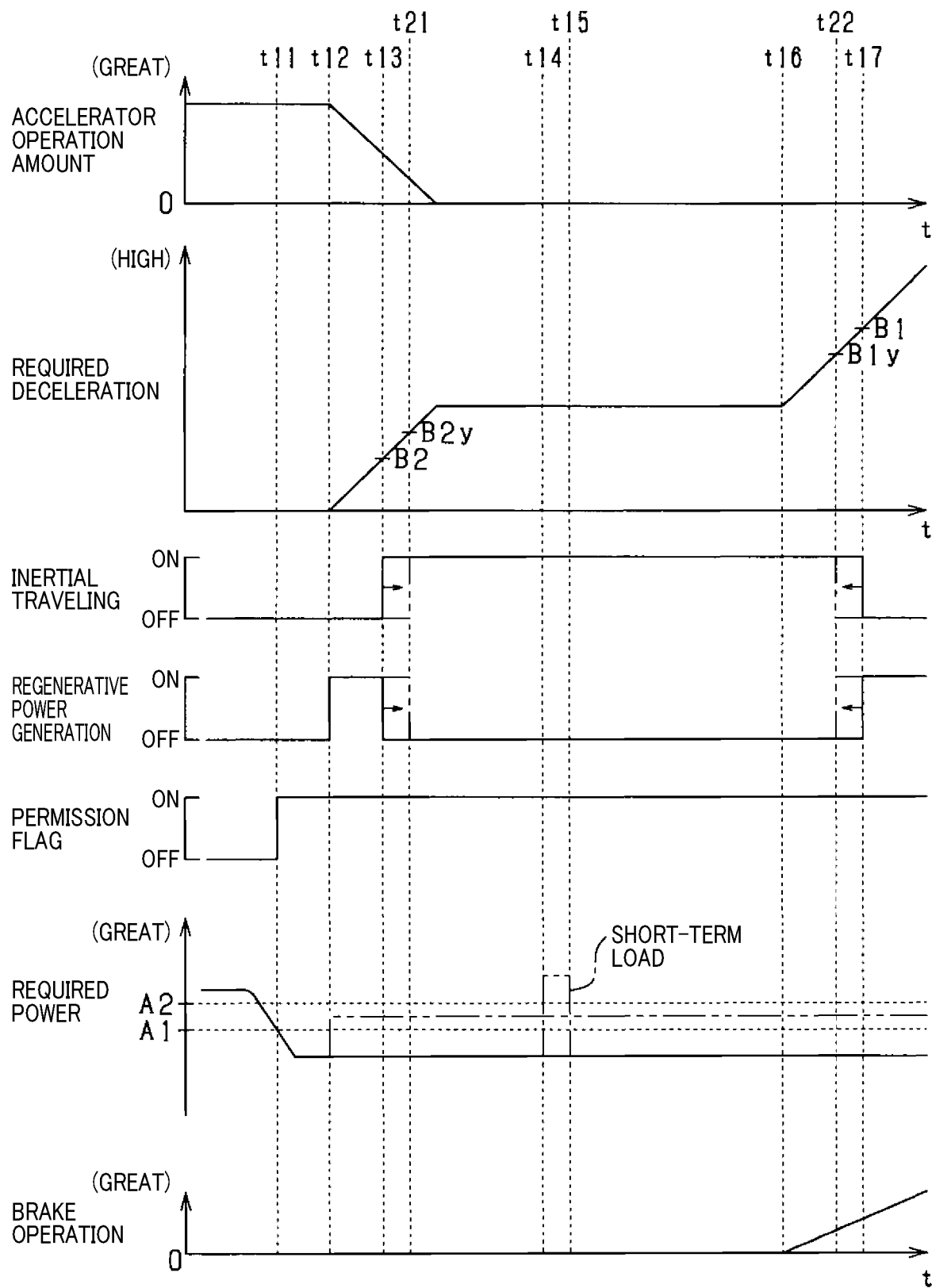
FIG. 12 is a timing chart of processing of the present embodiment.

Next, FIG. 12 illustrates a time chart more specifically showing the processing of FIGS. 3 and 6. FIG. 12 first illustrates that the vehicle 10 is in the non-deceleration normal traveling state. When the required power W becomes lower than the power threshold A1 at timing t11, the permission flag for the inertial traveling is set to ON. Then, at timing t12, when the driver's accelerator operation amount is decreased to bring the vehicle into the deceleration state, the regenerative power generation is executed according to, e.g., the SOC of the battery 14. Thereafter, the required deceleration D2 of the vehicle 10 gradually increases as the accelerator operation amount decreases. Then, at timing t13 at which the required vehicle deceleration D2 becomes higher than the deceleration threshold B2, the clutch is turned OFF, and the normal traveling (the regenerative power generation) is switched to the inertial traveling.

Subsequently, the short-term load is driven from timing t14 to timing t15. At this point, the power consumption of the electrical load transitions as indicated by a chain line, and temporarily becomes higher than the power threshold A2. However, in such a case, the power consumption due to driving of the short-term load is excluded from the required power W, and therefore, the required power W does not change. As a result, the permission flag is maintained ON, and accordingly, the inertial traveling is also maintained. Thereafter, when the driver's brake operation begins at timing t16, the required deceleration D1 gradually increases. Then, at timing t17 at which the required vehicle deceleration D1 becomes higher than the deceleration threshold B1, the clutch is turned ON to cancel the inertial traveling and switch the inertial traveling to the normal traveling. At this point, the regenerative power generation is performed in the vehicle deceleration state.

Next, a case where the deceleration thresholds B1, B2 change based on the required power W will be described. For example, in a case where FIG. 12 illustrates that the required power W transitions as indicated by a chain double-dashed line after the timing t12, the required power W is lower than the power threshold A2, and therefore, the permission flag for the inertial traveling is maintained ON. Note that the required power W increases beyond a solid line, and therefore, the deceleration threshold B2 is changed to B2y based on the required power W, for example. Accordingly, switching from the normal traveling (the regenerative power generation) to the inertial traveling shifts to timing t21. That is, the deceleration threshold B2 is set to a greater value based on the required power W, and therefore, a longer period for performing the regenerative power generation is ensured.

On the other hand, during the inertial traveling, the deceleration threshold B1 is, due to an increase in the required power W, changed to B1y based on such required power W, for example. Accordingly, switching from the inertial traveling to the normal traveling (the regenerative power generation) shifts to timing t22. That is, because of the deceleration threshold B1 set to a smaller value based on the required power W, the timing of switching the inertial traveling to the normal traveling (the regenerative power generation) is advanced, and a longer period for performing the regenerative power generation is ensured.

[3. Effects]

According to the present embodiment described in detail above, the following excellent advantageous effects are obtained.

In the vehicle having the function of performing the inertial traveling and the function of performing the regenerative power generation, the inertial traveling or the regenerative power generation by the ISG 13 is selectively performed based on the required vehicle power W in a state in which the inertial traveling implementation conditions are satisfied. In this case, the opportunity for regenerative power generation can be properly provided according to a vehicle power request. As a result, a power state of the vehicle 10 can be stably held while travel favorable for fuel consumption can be performed. Thus, the inertial traveling or the regenerative power generation can be properly selected and performed, and fuel consumption can be improved.

Specifically, in a case where the required power W is higher than the power threshold, the regenerative power generation is performed. Thus, in the case of high required power W, power consumption of the battery 14 can be reduced. As a result, the vehicle power state can be also stably held. Moreover, in a case where the required power W is lower than the power threshold, the inertial traveling is performed. Thus, in the case of low required vehicle power W, a travel distance of the vehicle 10 can be increased.

Moreover, two thresholds A1, A2 are set as the power threshold, and hysteresis is provided between these thresholds. Thus, disadvantages such as frequent switching between the state of performing the regenerative power generation and the state of performing the inertial traveling due to fluctuation in the required power W and lowering of the drivability due to such switching can be reduced.

It is assumed that the electrical loads 15 of the vehicle include the short-term load to be temporarily driven and used and the long-term load to be driven and used for a long period of time. Considering this point, when the driven electrical loads 15 include a short-term load during the inertial traveling, the inertial traveling is more likely to be selected as compared to a case where the electrical loads 15 do not include the short-term load. Specifically, the required power W is set to a small value. In such a case, the required power W excluding the power for driving the short-term load is calculated. Thus, frequent switching between the inertial traveling and the regenerative power generation due to a condition where the required power W exceeds the power threshold for a short period of time can be reduced, and therefore, lowering of the drivability can be reduced.

Further, when the driven electrical loads 15 include the long-term load, the regenerative power generation is more likely to be selected as compared to a case where the electrical loads 15 do not include the long-term load. That is, the required power W is deliberately set to a large value. In such a case, the regenerative power generation is more likely to be selected because the required power W is estimated to be large, as compared to actual required power, and the vehicle power generation request due to continuous use of the long-term load can be met. Moreover, fluctuation in the required power can be reduced, and frequent switching between the inertial traveling and the regenerative power generation can be reduced.

Usage of the electrical load 15 of the vehicle varies according to an individual driver or vehicle. Considering this point, the power thresholds A1, A2 are set based on the history information regarding the power consumption during traveling. Further, the history information is acquired according to the vehicle traveling conditions at the current point. In this case, the trend of the power consumption by the driver or the vehicle during traveling can be obtained from the history information. Moreover, a proper value can be, using the history information corresponding to the traveling conditions influencing the power consumption, set as the power threshold which is a reference in comparison of the level of required power. Thus, the threshold corresponding to an operation trend of the driver or the vehicle can be set, and a travel method can be properly selected and performed.

Implementation of the inertial traveling involves the required vehicle deceleration. Considering this point, the deceleration thresholds B1, B2 are set based on the required vehicle power W in the deceleration state of the vehicle 10, and the inertial traveling or the regenerative power generation is selectively performed based on the required decelerations D1, D2 and the deceleration thresholds B1, B2. Thus, the vehicle power state can be reflected on the deceleration as a requirement regarding implementation of the inertial traveling.

Specifically, the deceleration threshold B1 is set based on the required vehicle power W in the inertial traveling state. Thus, the required vehicle power W can be reflected on determination on continuation or cancellation of the inertial traveling. Moreover, in comparison between the deceleration threshold B1 and the required deceleration D1, in a case where the required deceleration D1 is higher than the deceleration threshold B1, the inertial traveling is canceled, and the regenerative power generation is performed. In such a case, switching to the regenerative power generation can reduce the power consumption of the battery 14, and the required vehicle deceleration D1 can be met by the load in association with the regenerative power generation, i.e., the regenerative brake. On the other hand, in a case where the required deceleration D1 is lower than the deceleration threshold B1, the inertial traveling is maintained. In this case, the inertial traveling is performed so that the travel distance can be increased. With the above-described configuration, the inertial traveling or the regenerative power generation can be properly selected and performed, and fuel consumption can be improved.

Moreover, the deceleration threshold B1 is set to a smaller value as the required power W increases. In this case, the deceleration threshold B1 is decreased in the inertial traveling state, and therefore, switching from the inertial traveling to the regenerative power generation is easily performed. Thus, the travel corresponding to the power state of the vehicle 10 can be selected.

[4. Other Embodiments]

The above-described embodiment may be changed as follows, for example.

In the above-described embodiment, the power consumption is calculated based on the charge/discharge current detection value detected by the battery sensor 47, but the present disclosure is not limited to such a method. For example, it may be configured such that a section configured to detect ON/OFF states of a switch provided at each electrical load 15 is provided and the power consumption is calculated based on an ON/OFF detection result of each electrical load 15.

In the above-described embodiment, the power consumption of the electrical load 15 is used as the required vehicle power W, but the present disclosure is not limited to above and may employ a configuration in which the battery SOC is used as the required vehicle power W, for example. In this case, the required vehicle power W is higher as the battery SOC decreases, and is lower as the battery SOC increases.

Note that the SOC is calculated using an estimation method based on open circuit voltage (OCV) and a calculation method by current integration. The open circuit voltage of the battery 14 is acquired such that a default SOC value is estimated using the acquired value and a map showing a correlation between the open circuit voltage and the SOC, and the charge/discharge current flowing in the battery 14 is acquired such that the SOC is successively calculated by cumulative calculation of the acquired value.

Determination of whether the driven electrical loads 15 include the short-term load or not may be changed as follows. For example, it may be configured such that in a case where the required power W becomes higher than the power threshold in association with switching of the electrical load 15 from OFF to ON during the inertial traveling, time elapsed after the required power W has became higher than the power threshold is measured and the permission flag for the inertial traveling is set to OFF when the elapsed time reaches predetermined time. In this case, based on continuous driving of the electrical load 15 for the predetermined time, it can be determined that the electrical load 15 is not the short-term load.

In the above-described embodiment, in a case where it is, at step S11 of FIG. 3, determined that the electrical loads 15 are driven, determination of whether the electrical loads 15 include the short-term load or not is made at step S12. In this regard, it may be configured such that the processing proceeds to step S14 without determination of step S12 and it is determined whether the electrical loads 15 include the long-term load, for example. In such a case, the processing proceeds to step S15 when the long-term load is included or proceeds to step S16 when the long-term load is not included, and then, the power consumption is calculated.

In the above-described embodiment, the power thresholds A1, A2 are set and hysteresis is provided between these thresholds, but may be set without hysteresis.

It may be configured such that the power thresholds A1, A2 are learnt based on the history information upon previous traveling. For example, it may be configured such that the power consumption during traveling or the power balance is calculated in every drive cycle and power thresholds for a subsequent drive cycle are determined based on such a value. The thresholds are learnt so that the number of applied steps can be reduced.

The history information used for setting the power thresholds may be history information for a single time of traveling, or may be history information for multiple times of traveling. Note that use of the history information for multiple times of traveling is preferred considering reliability.

In the present embodiment, the deceleration thresholds B1, B2 are calculated by the arithmetic processing for the reference values $B1x$, $B2x$ and the coefficients $\alpha$, $\beta$. In this regard, the present disclosure is not limited to above as long as the deceleration thresholds B1, B2 can be set according to the required power W. For example, the deceleration thresholds B1, B2 can be acquired using a map set in advance according to the required power W and the required decelerations D1, D2. Alternatively, it may be configured such that the deceleration thresholds B1, B2 are directly calculated based on the expression of correlation with the required power W.

In the present embodiment, the required deceleration D1 is calculated based on the brake operation amount (the brake pedal stepping-on amount), but the present disclosure is not limited to such a method. For example, it may be configured such that the required deceleration D1 is calculated based on the master cylinder pressure detected by the brake pressure sensor 46. Alternatively, the required deceleration can be calculated from a vehicle status without use of a parameter regarding the driver's brake operation. In this case, the required deceleration can be calculated based on a value obtained in such a manner that a deceleration corresponding to gradient resistance or accessory operation resistance is subtracted from a differential value of the vehicle speed, for example.

In the above-described embodiment, the ISG 13 is used as a device configured to perform the regenerative power generation, but the power output function by a motor unit is not necessarily provided and a regenerative device, such as an alternator, having only a regenerative power generation function may be used.

In the above-described embodiment, it is configured such that the ISG 13 is placed on a power source side with respect to the clutch device 19. That is, it is configured such that the ISG 13 is drivably coupled to the engine output shaft 12 and the regenerative power generation is performed based on rotation of the engine output shaft 12. In this regard, the installation position of the ISG 13 is not limited to such a position, but it may be configured such that the ISG 13 is placed on an axle side with respect to the clutch device 19, for example. That is, it may be configured such that the ISG 13 is placed on the power transmission path and the regenerative power generation is performed based on rotation of the transmission input shaft 21 or the transmission output shaft 22. Alternatively, it may be configured such that the ISG 13 is placed at each of the power-source-side and axle-side positions.

In the above-described embodiment, in each of the case of canceling the inertial traveling during the inertial traveling to perform the regenerative power generation and the case of starting the inertial traveling or the regenerative power generation during the normal traveling, the inertial traveling or the regenerative power generation is selectively performed considering the required vehicle power. Instead, it may be configured such that only either one of control in the case of canceling the inertial traveling during the inertial traveling to perform the regenerative power generation or control in the case of starting the inertial traveling or the regenerative power generation during the normal traveling is performed.

The present disclosure has been described in accordance with the embodiment, but it is understood that the present disclosure is not limited to such an embodiment or structure. The present disclosure also includes various modifications and modifications within an equivalent scope. In addition, various combinations and forms and other combinations and forms including more, less, or only a single element are also within the scope of the spirit and idea of the present disclosure.

What is claimed is:

1. A vehicle control device applied to a vehicle including an engine as a travel drive source, a clutch device provided on a power transmission path connected to the engine, a rotating electrical machine connected to a power supply unit and configured to perform regenerative power generation by power of the power transmission path to supply generated power to a power supply unit side, and an electrical load connected to the power supply unit, comprising:
    a memory;
    a processor communicable to the memory; and
    the processor being configured to:
        bring the clutch device into a disconnection state to perform inertial traveling of the vehicle if a predetermined inertial traveling implementation condition is satisfied and bring the clutch device into a connection state to cancel an inertial traveling state and perform the regenerative power generation if a predetermined regenerative power generation implementation condition during the inertial traveling is satisfied; and
        calculate required power of the vehicle, wherein
    the processor selectively performs the inertial traveling or the regenerative power generation by the rotating electrical machine based on the required power calculated in a state in which the inertial traveling implementation condition is satisfied, and performs the regenerative power generation in a case where it is determined that the required power is higher than a predetermined power threshold, and performs the inertial traveling in a case where it is determined that the required power is equal to or lower than the predetermined power threshold, and
    the processor is further configured to determine whether a short-term load to be temporarily driven and used is included as a driven electrical load in a vehicle deceleration state during the inertial traveling,
    in a case where it is determined that the short-term load is included, the inertial traveling is selected at a first rate, and in a case where it is determined that the short-term load is not included, the inertial traveling is selected at a second rate, the first rate being higher than the second rate.

2. The vehicle control device according to claim 1, wherein
    the predetermined power threshold has a first power threshold and a second power threshold greater than the first power threshold, the inertial traveling is permitted in a case where it is determined that the required power is lower than the first power threshold in a state in which the regenerative power generation is performed, and the regenerative power generation is permitted in a case where it is determined that the required power is higher than the second power threshold in the inertial traveling state.

3. The vehicle control device according to claim 1, wherein
    the processor calculates the required power as a smaller value in the case where it is determined that the short-term load is included than in the case where the short-term load is not included.

4. The vehicle control device according to claim 1, wherein the processor is further configured to:
    determine whether a predetermined long-term load (15*c*, 15*d*) to be driven and used for a long period of time is included in the driven electrical loads in the vehicle deceleration state during the inertial traveling, wherein in a case where it is determined that the predetermined long-term load is included, the regenerative power generation is selected at a first rate, and in a case where it is determined that the predetermined long-term load is not included, the inertial traveling is selected at a second rate, the first rate being higher than the second rate.

5. The vehicle control device according to claim 4, wherein
the processor is configured to calculate the required power as a greater value in the case where it is determined that the predetermined long-term load is included than in the case where the predetermined long-term load is not included.

6. The vehicle control device according to claim 1, wherein the processor is further configured to:
store, as history information, at least any of power consumption of the vehicle during traveling and a power balance between the power consumption and power generation; and
set the predetermined power threshold based on the history information.

7. The vehicle control device according to claim 6, wherein the processor is further configured to:
store, for each of multiple traveling conditions of the vehicle, at least any of the power consumption and the power balance as the history information, and
acquire the history information according to a current traveling condition of the vehicle, and sets the power threshold based on the history information.

8. The vehicle control device according to claim 1, wherein the processor is further configured to:
calculate a required deceleration for the vehicle in the deceleration state of the vehicle; and
set a predetermined deceleration threshold to a smaller value as the required power increases in the deceleration state,
wherein the processor selectively performs the inertial traveling or the regenerative power generation by the rotating electrical machine based on the required deceleration and the deceleration threshold.

9. The vehicle control device according to claim 8, wherein
the processor is further configured to cancel the inertial traveling to start the regenerative power generation in a case where it is determined that the required deceleration is higher than the deceleration threshold in the inertial traveling state, and maintain the inertial traveling in a case where it is determined that the required deceleration is lower than the deceleration threshold.

10. A vehicle control device applied to a vehicle including an engine as a travel drive source, a clutch device provided on a power transmission path connected to the engine, a rotating electrical machine connected to a power supply unit and configured to perform regenerative power generation by power of the power transmission path to supply generated power to a power supply unit side, and an electrical load connected to the power supply unit, comprising:
a memory;
a processor communicable to the memory; and
the processor being configured to:
bring the clutch device into a disconnection state to perform inertial traveling of the vehicle if a predetermined inertial traveling implementation condition is satisfied and bring the clutch device into a connection state to cancel an inertial traveling state and perform the regenerative power generation if a predetermined regenerative power generation implementation condition during the inertial traveling is satisfied; and
calculate required power of the vehicle, wherein
the processor selectively performs the inertial traveling or the regenerative power generation by the rotating electrical machine based on the required power calculated in a state in which the inertial traveling implementation condition is satisfied, and performs the regenerative power generation in a case where it is determined that the required power is higher than a predetermined power threshold, and performs the inertial traveling in a case where it is determined that the required power is equal to or lower than the predetermined power threshold, and
the processor is further configured to determine whether a predetermined long-term load to be driven and used for a long period of time is included in the driven electrical loads in the vehicle deceleration state during the inertial traveling,
in a case where it is determined that the predetermined long-term load is included, the regenerative power generation is selected at a first rate, and in a case where it is determined that the predetermined long-term load is not included, the inertial traveling is selected at a second rate, the first rate being higher than the second rate.

11. The vehicle control device according claim 10, wherein
the processor is further configured to calculate the required power as a greater value in the case where it is determined that the predetermined long-term load is included than in the case where the predetermined long-term load is not included.

12. The vehicle control device according to claim 10, wherein the processor is further configured to:
store, as history information, at least any of power consumption of the vehicle during traveling and a power balance between the power consumption and power generation; and
set the predetermined power threshold based on the history information.

13. The vehicle control device according to claim 12, wherein
the processor is further configured to:
store, for each of multiple traveling conditions of the vehicle, at least any of the power consumption and the power balance as the history information, and
acquire the history information according to a current traveling condition of the vehicle, and sets the power threshold based on the history information.

14. The vehicle control device according to claim 10, wherein the processor is further configured to:
calculate a required deceleration for the vehicle in the deceleration state of the vehicle; and
set a predetermined deceleration threshold to a smaller value as the required power increases in the deceleration state,
wherein the processor selectively performs the inertial traveling or the regenerative power generation by the rotating electrical machine based on the required deceleration and the deceleration threshold.

15. A vehicle control device applied to a vehicle including an engine as a travel drive source, a clutch device provided on a power transmission path connected to the engine, a rotating electrical machine connected to a power supply unit and configured to perform regenerative power generation by power of the power transmission path to supply generated power to a power supply unit side, and an electrical load connected to the power supply unit, comprising:

a memory;

a processor communicable to the memory; and the processor being configured to:

bring the clutch device into a disconnection state to perform inertial traveling of the vehicle if a predetermined inertial traveling implementation condition is satisfied and bring the clutch device into a connection state to cancel an inertial traveling state and perform the regenerative power generation if a predetermined regenerative power generation implementation condition during the inertial traveling is satisfied; and calculating required power of the vehicle, wherein the processor selectively performs the inertial traveling or the regenerative power generation by the rotating electrical machine based on the required power calculated in a state in which the inertial traveling implementation condition is satisfied, and the processor is further configured to:

calculate a required deceleration for the vehicle in the deceleration state of the vehicle; and set a predetermined deceleration threshold to a smaller value as the required power increases in the deceleration state, wherein the processor selectively performs the inertial traveling or the regenerative power generation by the rotating electrical machine based on the required deceleration and the deceleration threshold.

16. The vehicle control device according to claim 15, wherein the processor is further configured to:

cancel the inertial traveling to start the regenerative power generation in a case where it is determined that the required deceleration is higher than the deceleration threshold in the inertial traveling state, and maintain the inertial traveling in a case where it is determined that the required deceleration is lower than the deceleration threshold.

* * * * *